United States Patent [19]
Wathne

[11] Patent Number: 5,524,810
[45] Date of Patent: Jun. 11, 1996

[54] SOLDER REFLOW PROCESSOR

[75] Inventor: Kail S. Wathne, Santa Barbara, Calif.

[73] Assignee: Sikama International, Inc., Santa Barbara, Calif.

[21] Appl. No.: 227,541

[22] Filed: Apr. 14, 1994

[51] Int. Cl.⁶ .................................................. B23K 1/012
[52] U.S. Cl. ............................................. 228/42; 219/388
[58] Field of Search ................................... 228/42, 233.2; 219/388

[56] References Cited

U.S. PATENT DOCUMENTS 4,938,410  7/1990  Kondo ........................................ 219/388
5,069,380  12/1991  Deamborsio ................................ 228/42
5,230,460  7/1993  Deamborsio et al. .................... 228/42 X Primary Examiner—Kenneth J. Ramsey
Attorney, Agent, or Firm—Donald D. Mon

[57] ABSTRACT

A tunnel-type processor for solder flow application of solder connections to circuit elements on a circuit board. The boards with deposited solder are passed through a heating zone and a cooling zone, on a platen. Heated or cooled gas is injected into the zones to maintain a suitable temperature along with the platen. A housing with an exhaust conduit encloses the platen and limits flow of gas from one zone into another. An optional top manifold can be provided to discharge gas into a respective zone.

9 Claims, 5 Drawing Sheets

SOLDER REFLOW PROCESSOR

SPECIFICATION

1. Field of the Invention

A processor for causing solder initially deposited on a substrate to "reflow" and make reliable electrically conductive connections to electronic and electrical circuit elements which are also placed on the substrate.

2. Background of the Invention

The concept of making circuit connections by means of heating solder deposited on a substrate so it will melt and "reflow" to an intended location such as the terminal of a circuit element to bond with it and then cooling it is known. This application makes no claim to the process itself, but instead is intended to provide processing equipment which produces product with remarkable consistency and reliability, and which substantially reduces processing costs below those which formerly were regarded as acceptable. The cost of the equipment itself is surprisingly reasonable, especially in view of the advantages which it provides.

The art of solder reflow depends on pre-positioning electronic and electrical circuit elements on a substrate, and placing solder on the substrate between terminals to be connected through the solder. Frequently the solder is applied to the substrate by a silkscreen technique or is deposited by hand, and sometimes some of the circuit elements are similarly applied, always at temperatures below the melting point of the solder. In whatever event, the circuit elements and the solder paste or preform are placed in appropriate locations on the substrate. In this initial condition, the circuitry is incomplete and useless.

Completion of the circuitry by controlled melting and "reflow" of the solder is an established art. However, prior art efforts have been directed toward batch processing, in which high scrap rates could be expected when a large number of substrates were simultaneously processed. Scrap rates could extend from zero to one hundred percent for the batch, resulting in various percentages of acceptable product produced in a single batch.

Inherent in this process is the need to heat the solder (and its surroundings) to a temperature sufficient to melt it so it bonds to the terminals, and then to cool it quickly enough to protect the other circuit elements and solidify the solder in its new orientation. In batch processing, uniformity for all of the products is very difficult to attain. Furthermore, batch processing involves considerable expensive labor to load, unload, and monitor the processor.

It is an object of this invention to provide a steady-flow tunnel-type processor which receives substrates to be processed, one-by-one or group-by-group. The processor can be loaded and unloaded one-by-one or group-by-group, with ready adaptability to continuous inspection of the product, and with reliably consistent manufacture from substrate to substrate. Near zero scrap rates can confidently be predicted.

BRIEF DESCRIPTION OF THE INVENTION

In a processor according to this invention, the processor includes a base platen along which the substrates are moved at a known velocity through at least one heating zone and at least one cooling zone that are maintained at appropriate temperatures, with suitable residence time in each zone. If desired, a pre-heating zone and an after-cooling zone can also be provided. The principal heating zone is intended to bring the solder to a temperature at which it will flow, and to maintain it at that temperature for a time sufficient for the requisite solder flow and bonding to the terminal to occur. The function of the principal cooling zone is quickly to bring the temperature of the solder below its melting point, and to reduce thermal stress on the circuit elements carried by the substrates. Pusher means moves the substrates through the zones. Residence time can be varied by adjusting the velocity of the pusher means, and even by stopping the product in some zone for a pre-determined period of time.

According to this invention, the platens in the respective zones are either heated or cooled as appropriate. Conduction or radiation (or both) from the base platen to the substrate is one means for heating the product and the solder. Additionally, gas which is heated or cooled as appropriate to its respective zone is injected into its zone, through a plurality of orifices in the platens. The effect is to inject heated or cooled gas into the respective zone further to maintain the temperature at a level suitable to its location in the processor, and when oxygen is deleterious to the product, substantially to exclude oxygen from the zones. When the substrate is flat, the orifices in the base platen may also act to form a gas bearing effect, lifting the substrate slightly above the base platen. Then heating from the base platen itself is more radiant than conductive.

A housing encloses the base platen, and is provided with exhaust means which tends to limit flow of gas from one zone into another, although some such flow will occur.

According to a feature of the invention, a top manifold is complementary to a base platen and spaced from it, which discharges heated or cooled gas into a respective zone.

According to another optional feature of the invention, the vertical spacing between the platen and the top manifold is adjustable.

The above and other features of this invention will be fully understood from the following detailed description and the accompanying drawings, in which:

BRIEF DESCRIPTION OF THE DRAWINGS

FIGS. 1 and 2 join at their right and left hand edges, respectively;

DETAILED DESCRIPTION OF THE INVENTION

Figure 1:
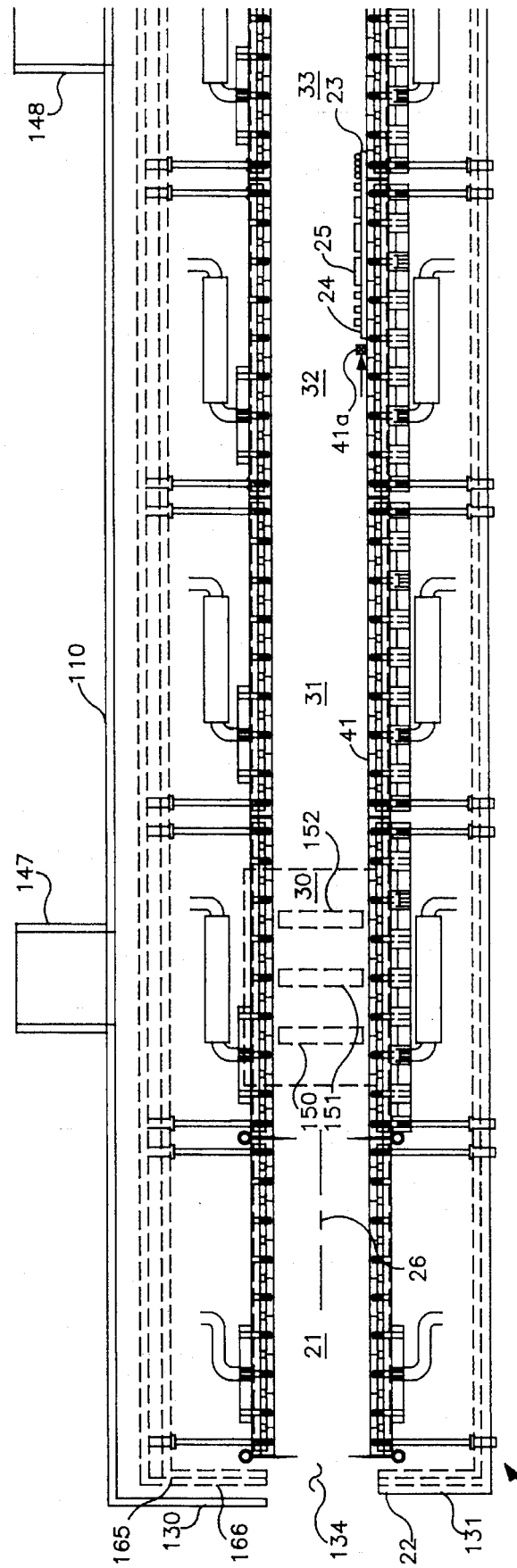
FIG. 1 is a vertical, axial cross-section of one part of the preferred embodiment of the invention.
Figure 2:
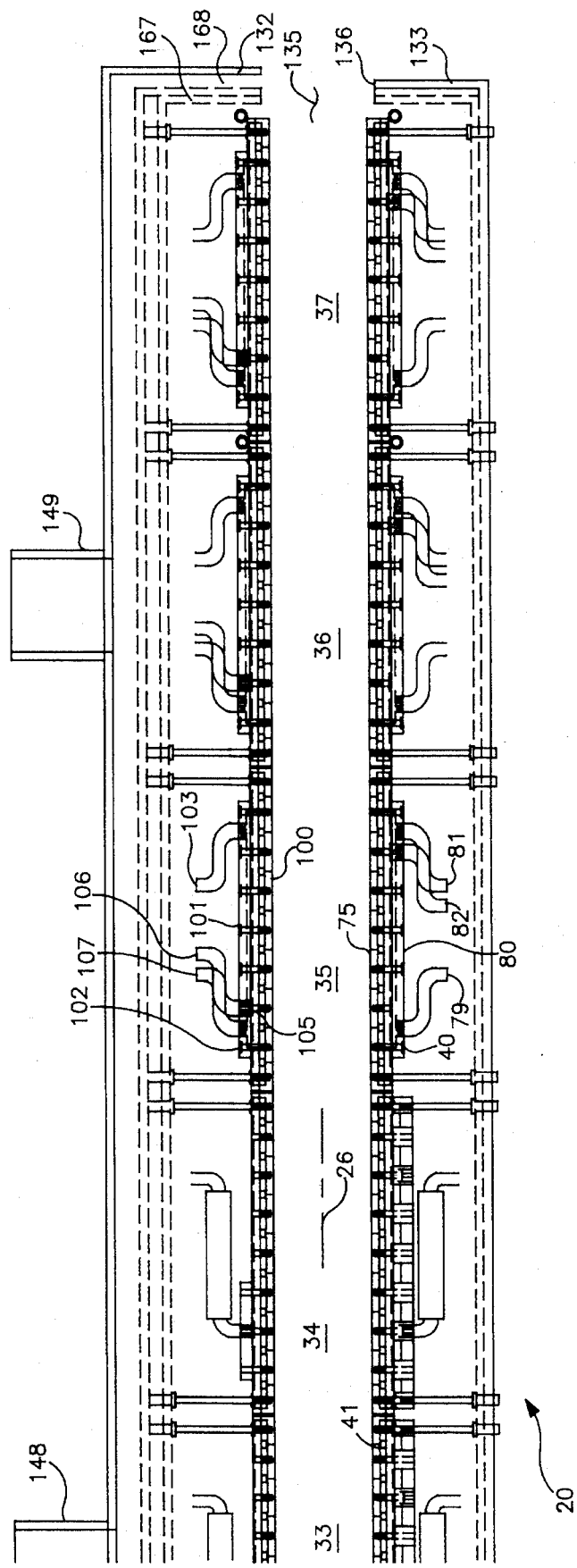
FIG. 2 is a view similar to FIG. 1, showing the remainder of the processor.

A tunnel-type processor 20 is shown in side view in FIGS. 1 and 2. It includes an optional ambient loading zone 21 which opens at its input end 22 to atmosphere. As will become evident, it provides a gas curtain at input end 22. Product 23, of which only a single example is shown, is loaded at the input end. A typical product is shown, comprising a flat substrate 24 with electrical or electronic circuit elements 25 on it which will be connected by solder (not shown) that will be melted to reflow onto the substrate and onto terminals of the circuit elements. The processor is aligned on an axis 26. A rod-like pusher bar extends across the platen, and is powered by means not shown to push the product through the processor. Any suitable number of these pushers can be provided.

Although only one heating zone and one cooling zone are necessary, it is better practice to provide a plurality of them, and these in modules so their temperatures can individually be controlled. As shown there are five heating zones 30,31, 32,33, 34, and three cooling zones 35,36,37. This number of zones is sufficient for almost any process requirement. Processors with more or fewer zones can be used for some products. Therefore the number of zones is not a limitation on the invention.

Base platen 40 provides a flat support surface 41 along which the product will be moved by pusher blades 41a, from zone to zone. The base platen is provided in modules, one for each zone. The heat zone modules are generally identical to one another, and the cooling zone modules are also generally identical to one another.

Figure 3:
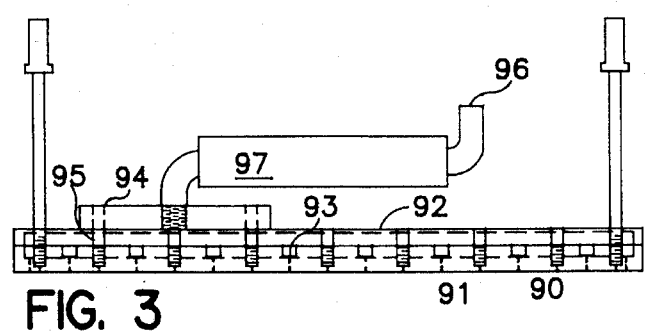
FIG. 3 is an edge view of an upper manifold module.
Figure 4:
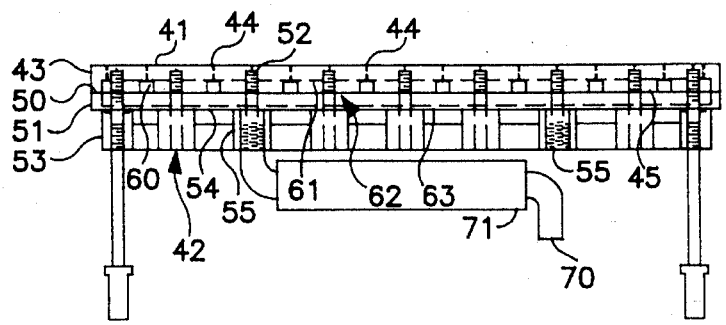
FIG. 4 is an edge view of a base platen module.
Figure 5:
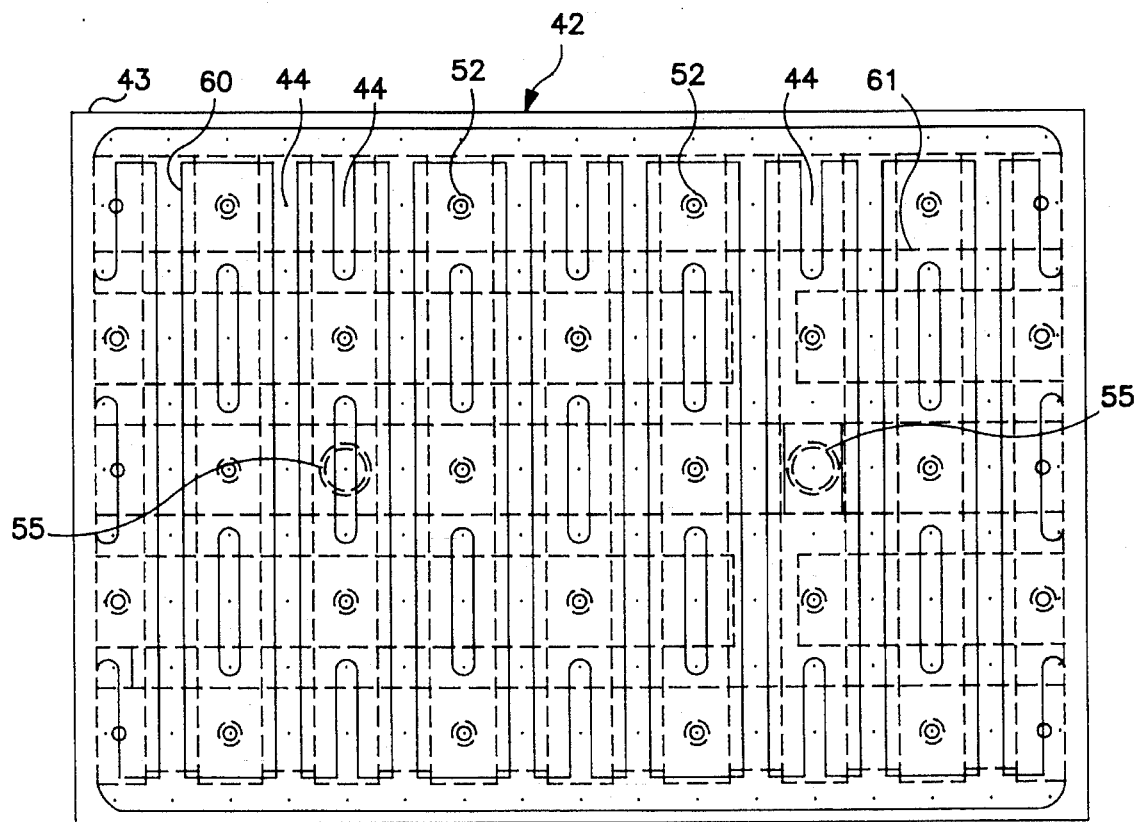
FIG. 5 is a top view taken at line 5—5 in FIG. 4.
Figure 6:
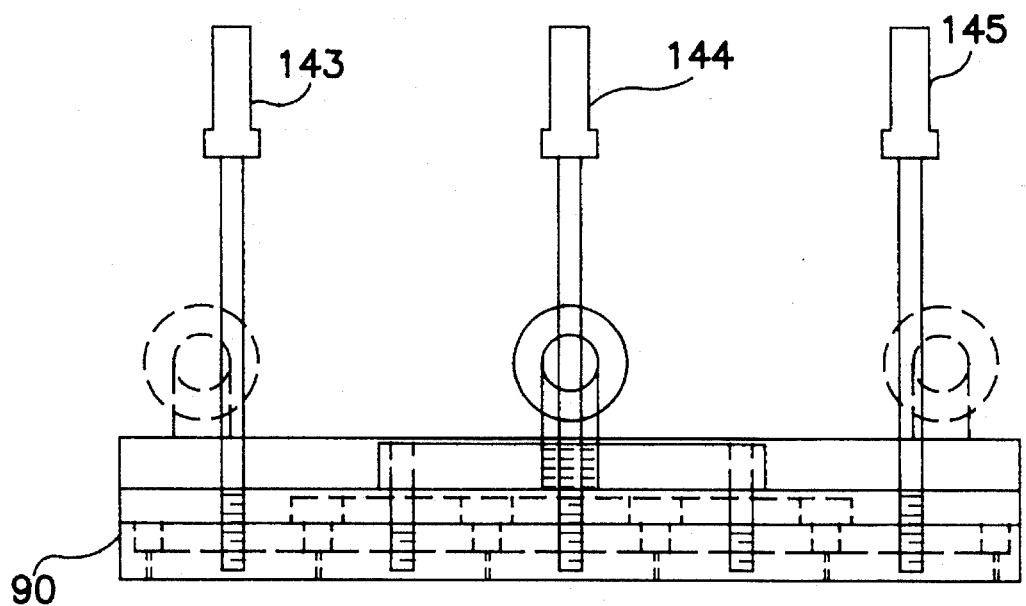
FIG. 6 is an end view of an upper manifold module.
Figure 7:
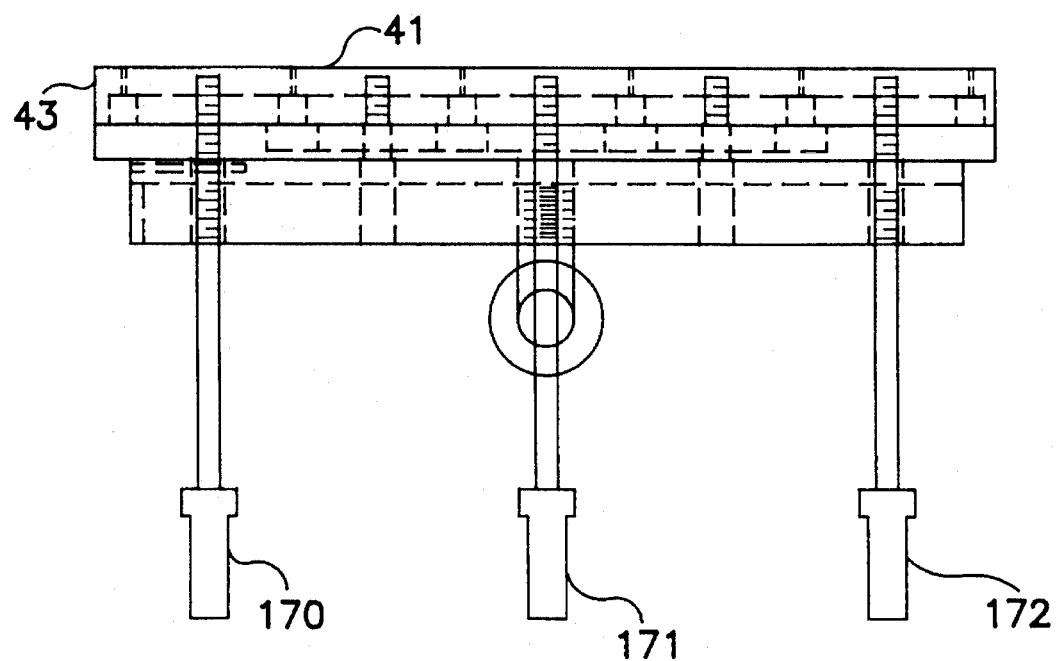
FIG. 7 is an end view of a base platen module.

An example of a heating zone module 42, useful in any of the heating zones 30–34, is shown in FIGS. 3–5. It includes an orifice plate 43, whose upper face is support surface 41. A plurality of relatively small orifices 44 pass through the orifice plate from surface 41 to a lower face 45.

The upper face 50 of a manifold plate 51 is fastened to the orifice plate by fasteners 52. A base plate 53 is fastened to the lower face 54 of the manifold plate. There results a tight sandwich construction in which the orifice plate, manifold plate, and base plate are in tight thermally-conductive contact. The base plate is preferably made of cast iron. The orifice plate and manifold plate may be made of any suitably heat conductive metal such as aluminum or stainless steel.

At least one cartridge type heater 55, preferably two or more, will be fitted into sockets in the base plate. It is their function to heat the base plate, and thereby also to heat the manifold plate and the orifice plate, to heat surface 41 and thereby heat the substrate—by conduction when the substrate rests on the support surface, and by radiation when the substrate is raised above it. Also it heats, or adds to the heat, of gas which passes through it and enters the zone further to heat the product.

The above description describes the arrangement for heating the base platens. The manifold system to supply heated gas to the zones will now be described.

Orifices 44 are shown as small dots. Each enters into a pattern of lateral grooves 60 which variously intersect longitudinal grooves 61 in the manifold plate. In turn, grooves 62 in the base plate intersect grooves 63 in the manifold plate. Accordingly there is a direct flow path from grooves 62 in the base plate to each of the orifices. This is a tortuous path which provides ample path length for the gas to be heated.

Gas is supplied through gas inlet port 70, provided with an upstream optional pre-heater 71. Gas from this port is fed into grooves 62. The gas will customarily be either nitrogen or forming gas. Forming gas is a mixture of 95% nitrogen and 5% hydrogen. Any other gas or mixture of gases which is not deleterious to the product being processed can be used instead.

The cooling zones provide a cooled support surface 42 instead of a heated one. The example (FIG. 2) shown is zone 35, wherein for manufacturing convenience and economy, the orifice plate 75 and manifold 76 are identical to those in the heating zones. However, the base plates 78 are different. They include the same grooves for gas supplied through gas input 79, but are provided with additional channels 80 for flow of chilled water to cool the base plate and the gas, instead of with heaters. Inlet and outlet ports 81,82 are provided for supplying and withdrawing the water.

An upper manifold overlays each of the platens. These are coextensive with and are spaced vertically above the platens. Their function is to supply heated gas or cooled gas into the respective zones. Generally they are formed the same as the platens which they overlay, except that in the heating zones there is no base plate, nor any heaters to heat it, nor coolers to cool it. This is because there is no very near approach or contact between the substrate and the upper plates. However, injection of heated or cooled gas into the respective zone is intended to keep the temperature of the zones at a predetermined value. The same kind of gas is supplied to the manifold as to the base platens.

For example, in heating zone 31 there is a downwardly facing plate 90 (FIG. 3) with a plurality of orifices 91 discharging into the respective zone. A manifold plate 92 abuts plate 90, and channels 93 are formed between them which lead to the orifices. An adaptor 94 overlays a plurality of opening 95 through the manifold plate which lead to channels 93, and connects a source 96 of heated gas to them, and thereby to the orifices. A heater 97 heats the gas to a predetermined and controlled temperature.

In cooling zone 35, an identical plate 100 and manifold plate 101 are provided, except that adaptor 102 has provisions both for gas flow and for cooling. Gas from source 103 flows through the manifold plate as before. However, adaptor 102 is further provided with channel means 105 to receive chilled water from a source 106 and return it to an outlet 107. As with the base platens, gas is supplied and is also cooled in the cooling zone or zones.

The foregoing describes the portions of the processor which the products "sees". Heating and cooling is provided by appropriate heating of the base plate and of the temperature of the gases. There remains to be described the surrounding enclosure which enables close control over the zone conditions, as well as separation from the atmosphere. In this processor, it is unnecessary to provide curtains at its ends or between the zones, although this can be done. Instead, it relies on localized heating or cooling of the modular base plates and base platen, localized control over gas supply temperatures, and pressures and localized exhaust of gas from the various zones. The heating and cooling zones will be maintained at a pressure sufficiently higher than atmosphere to exclude substantial incoming airflow.

Housing 110 (see FIGS. 8 and 9) has a pair of trough-like base members 111,112, each with a flat base 113,114 and two pairs of upright flanges 115,116 and 117,118. The upright flanges are spaced from one another.

A trough-like outlet cap member 120 has a top cap 121 and a pair of downwardly-extending flanges 122,123, which respectively are removably engaged to outermost flanges 115 and 118 to form a tunnel-like outer housing. End walls 130, 131, 132, 133 close the members at their ends, leaving openings 134, 135 at the input end 22 and the output end 136 for entering and exit of the product.

An inner cap member 140 has a cap 141 and two downwardly extending flanges 141a and 141b parallel to innermost flanges 117 and 118. A bridge member 142 depends from top 140 and supports the upper manifolds through groups of vertically adjustable suspensions 143, 144, 145 in sets, one set at each end of each manifold. Bridge member 142 can be raised or lowered relative to supports 142a and 142b from the inner cap member to vary the height of the zones between the base platens and the upper manifolds, and thereby also their volummes.

The upper portion 146 of the exhaust plenum is formed between the caps. A group of exhaust vents 147, 148, 149 exhaust to atmosphere from the plenum.

Zonal control is exerted by a group of adjustable exhaust ports 150, 151, 152 in at least one of the flanges, only one set of which is shown in FIG. 1. A similar set will be formed in each zone.

Figure 8:
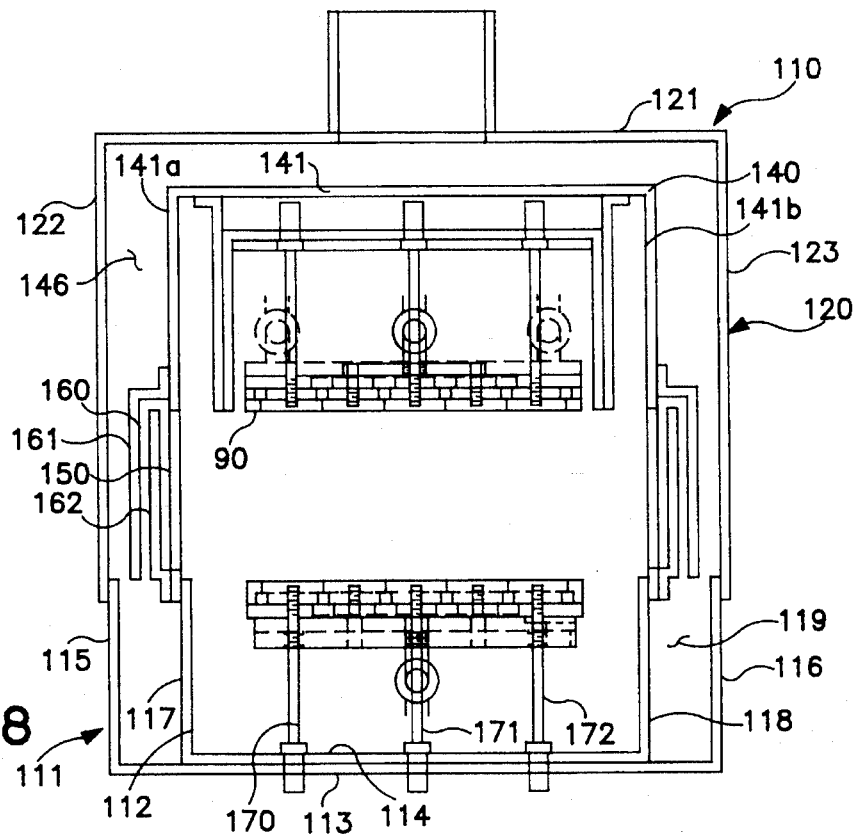
FIG. 8 is a vertical lateral cross-section taken at line 8—8 in FIG. 1.
Figure 9:
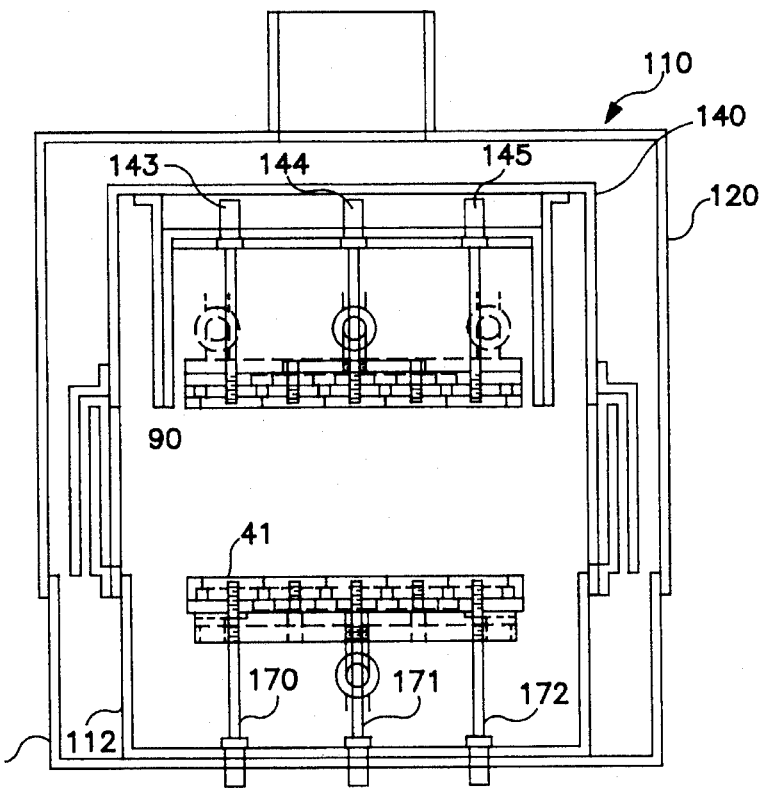
FIG. 9 is a view similar to FIG. 8, showing a different adjustment of an upper manifold and a lower base platen.

The exhaust ports as a group are overlaid by a blade-type restrictor 160 (FIGS. 8 and 9). Two parallel spaced apart blades 161, 162 are respectively attached to flanges 117 and 141a.

Members 112 and 140 are terminated by walls 165, 166, 167, 168 to close the ends of the upper portion of the exhaust plenum.

The operation of this processor is straightforward. Because it is a steady flow device, it is necessary to adjust each of its zones and its throughput rate to cause the individual product to be heated to a predetermined temperature, held there long enough for suitable solder flow, and then to cool the product so it exits at nearly room temperature. Suitable instrumentation will be provided to measure the temperature in each zone, but this is only part of the adjustments, because the ratio of heat provided by the base platen to the heat provided by the heated gases is also of importance. Test samples will be sent through the processor until an appropriate adjustment is made, and then the processor will be continuously run.

It is also necessary from time to time to shut the processor down and adjust it for a different product. Previous settings for a given product can be recorded, and these settings can be used for subsequent runs, thereby simplifying the adjustment of the processor for different products.

Adjustability of the tunnel height (the vertical spacing between the base platen and its overlaying manifold) is shown in FIGS. 8 and 9. FIG. 8 illustrates a minimum height setting (often as small as one inch), and FIG. 9 a maximum height setting (often as large as four inches). The upper manifold and lower base platen are supported by mounts 143, 144, 145 and 170, 171, 172 in sets of three which can be adjusted to level the upper manifolds and the base platen.

The processor of this invention thereby provides a device which can be adjusted to accommodate substrates and circuits of widely varying size and shape, and which is adapted for simple and reliable zonal control for continuous processing.

In addition, even though it is open at both ends to permit entry and exit of product, the arrangements of gas inlet and exhaust are such that especially in the regions where the solder is heated to a temperature at which oxygen could adversely affect it, the oxygen content in these zones is so low that the product is not adversely affected. The rates of input flow of the gases, and the settings of the exhaust ports can be set such that gas flow of the ends of the tunnel is primarily outward.

The patterns and sizes of the orifices in the base platens and upper manifolds will be determined in large part by the anticipated size of the substrates, and in part depending on whether a gas bearing effect is desired.

Special attention is called to the adjustability of the spacing between the upper and lower plates. This enables a closer control over the temperatures and of the oxygen content of the gases in the zones, because the latent volume of the zone can be minimized, depending on the height of the workpiece. This processor is not limited to processing products with a flat substrate. Instead it can process products of any shape, and the adjustability between the top and bottom shapes provides significant flexibility to the utility of the processor.

This invention is not to be limited to the embodiment shown in the drawings and described in the description which is given by way of example and not of limitation but only in accordance with the scope of the appended claims.

I claim:

1. A tunnel-type processor for solder-reflow processes wherein a substrate bearing electrical or electronic components with terminals is intended to have various of said terminals conductively interconnected by solder laid on the substrate and bonded to said terminals, said solder being initially provided as a solid body applied to said substrate and to said terminals but not bonded thereto, and thereafter being bonded to said terminals by heating said solder in said processor to cause it to melt and reflow to bond with said terminals and with said substrate, said processor comprising:

a channel-like base having a base portion and an outermost and an innermost pair of spaced apart upwardly extending flanges;

a first channel-like cap having a cap portion and a pair of spaced apart downwardly extending flanges engaged to the outermost pair of flanges of the base to form a continuous structure;

a second channel-like cap having a second cap portion vertically spaced from said first cap portion, and also including a second pair of downwardly-extending flanges engaged to said innermost pair of flanges of the base to form a continuous structure;

said innermost and outermost pairs of flanges, and said first and second cap portions being spaced from one another to form between them an exhaust plenum;

an exhaust port through said first cap portion to enable exhaust of gases from said exhaust plenum;

a plurality of exhaust ports formed in at least one of said innermost pairs of flanges to enable flow of gas from the region inside said innermost flanges to said exhaust plenum;

bridge means supported by said second cap portion;

a plurality of base platen modules each having a support surface, said support surfaces being aligned so that substrates may be moved along them, said base platen modules being mounted to said base between its innermost pair of flanges;

a plurality of upper manifolds supported from said bridge, at least some of which overlay a respective base platen module;

said base platen modules and upper manifolds being vertically spaced apart from another, substantially parallel to one another, and extending axially;

pusher means to push substrates along the surfaces of said base platen module;

each said base platen module providing a zone of respective condition of temperature, with a said exhaust port respective to each zone, said base platen modules and upper manifolds having flow channels for gas opening into respective said zones;

heater means to heat at least some of said base platen modules;

cooler means to cool at least some of said base platen modules; and exhaust means from said plenum.

2. Apparatus according to claim 1 in which said bridge is vertically adjustable relative to said second cap member.

3. Apparatus according to claim 2 in which said upper manifolds are vertically adjustable relative to said bridge at a plurality of locations so as to level the manifolds.

4. Apparatus according to claim 1 in which said base platen modules are vertically adjustable relative to said member at a a plurality of locations so as to level the base platen member.

5. Apparatus according to claim 1 in which a plurality of said base platen modules is provided with said flow channels, at least one of which is cooled, said flow channels opening onto the surface of said base platen modules for injection of heated or cooled gas into the respective zone.

6. Apparatus according to claim 5 in which said flow channels open onto said surface in a pattern of relatively small spaced apart orifices.

7. Apparatus according to claim 1 in which a plurality of said upper manifolds is provided with said opening into the respective zones for injection of heated or cooled gas into the respective zone.

8. Apparatus according to claim 7 in which a plurality of said base platen modules is provided with said flow channels through a manifold platen, at least one of which is heated and at least one of which is cooled, said flow channels opening onto the surface of said base platen modules for injection of heated or cooled gas into the respective zone.

9. Apparatus according to claim 1 in which the ends of the base and of the cap are partially closed to reduce the opening through which air can enter the processor.

* * * * *